(12) United States Patent
Hsiung et al.

(10) Patent No.: US 8,371,712 B2
(45) Date of Patent: Feb. 12, 2013

(54) LIGHT SOURCE MODULE OF PROJECTOR

(75) Inventors: Chien-Chih Hsiung, Taichung (TW); Yu-Hsiang Huang, Taichung (TW); Yun-Yi Lin, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 49 days.

(21) Appl. No.: 13/165,622

(22) Filed: Jun. 21, 2011

(65) Prior Publication Data

US 2012/0120648 A1 May 17, 2012

(30) Foreign Application Priority Data

Nov. 12, 2010 (TW) .............................. 99139051 A

(51) Int. Cl.
*F21V 9/00* (2006.01)

(52) U.S. Cl. ........ 362/231; 359/618; 359/619; 359/634; 353/33; 353/38; 353/81

(58) Field of Classification Search .................. 362/231; 359/831, 833, 834, 836, 837, 626, 618, 619, 359/629, 634, 639, 640; 353/28, 30, 34, 353/38, 81; 385/15–18

See application file for complete search history.

(56) References Cited

U.S. PATENT DOCUMENTS

| | | | |
|---|---|---|---|
| 6,847,486 B2 * | 1/2005 | Maestle et al. ................. | 359/618 |
| 6,910,771 B1 * | 6/2005 | Lee ................................. | 353/20 |
| 2008/0266668 A1 * | 10/2008 | Penn ............................... | 359/629 |

* cited by examiner

*Primary Examiner* — Anh Mai
*Assistant Examiner* — Elmito Breval
(74) *Attorney, Agent, or Firm* — Tracy M. Heims; APex Juris, pllc

(57) ABSTRACT

A light source module of a projector includes a beam splitter, a red light source, a blue light source, and a blue light source. The beam splitter has a first reflection side, on which a first splitter film is provided, and a second reflection side, on which a second splitter film is provided. An angle between a normal line of the first reflection side, and a normal line of the second reflection side, is in a range between 165 degrees and 180 degrees. Both the first splitter film and the second splitter film permit red rays to pass therethrough. The red light source is separated from the blue and green light sources to obtain a better thermal dissipation.

5 Claims, 6 Drawing Sheets

LIGHT SOURCE MODULE OF PROJECTOR

BACKGROUND OF THE INVENTION

1. Field of the Invention

The present invention relates generally to a projector, and more particularly, to a light source module of a projector.

2. Description of the Related Art

FIG. 1 shows a conventional light source module 110 of a projector which has a red light source 111, a green light source 112, and a blue light source 113 surrounding two beam splitters 120. The beam splitters 120 reflect the ray of a specific color, or permit it to pass through that only some specific rays from the light sources 111, 112, and 113 may pass through the beam splitters 120, to a lens array 130 under the beam splitters 120, to form a specific color image.

An arrangement of the light sources 111, 112, and 113 may create a color image, however, the temperature of the red light source 111 will be higher than the green and blue light sources 112, 113, in the same condition, and this is because the red light will heat up faster than the other lights. When the projector is turned on for some time, a temperature of a base of the red light source 111 will become too high to have a luminous intensity of the red ray, lower than the green ray and blue ray that, the red light source needs to be replaced quicker than the green and blue light sources 112, 113. Therefore, the projector would need to be repaired frequently, and most of the time, it is because of the red light source 111.

SUMMARY OF THE INVENTION

The primary objective of the present invention is to provide a light source module of a projector, in which the red light source may have a longer product life to extend the time to repair the projector.

According to the objective of the present invention, a light source module of a projector includes a beam splitter, a red light source, a blue light source, and a green light source. The beam splitter has a first reflection side, on which a first splitter film is provided, and a second reflection side, on which a second splitter film is provided. An angle between a normal line of the first reflection side and a normal line of the second reflection side, is in a range between 165 degrees and 180 degrees, both the first splitter film and the second splitter film permit red rays to pass therethrough. The red light source is arranged at a side facing the first reflection side of the beam splitter, and the blue and green light sources are arranged at a side facing the second reflection side of the beam splitter.

DETAILED DESCRIPTION OF THE INVENTION

Figure 1:
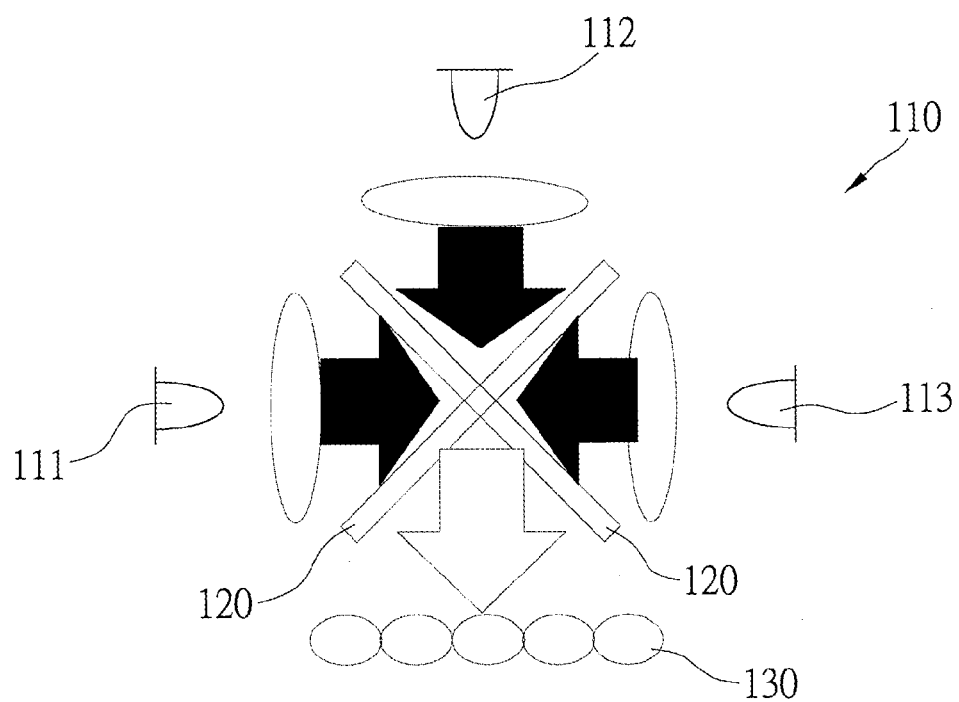
FIG. 1 is a sketch diagram of the conventional light source module of the projector.
Figure 2:
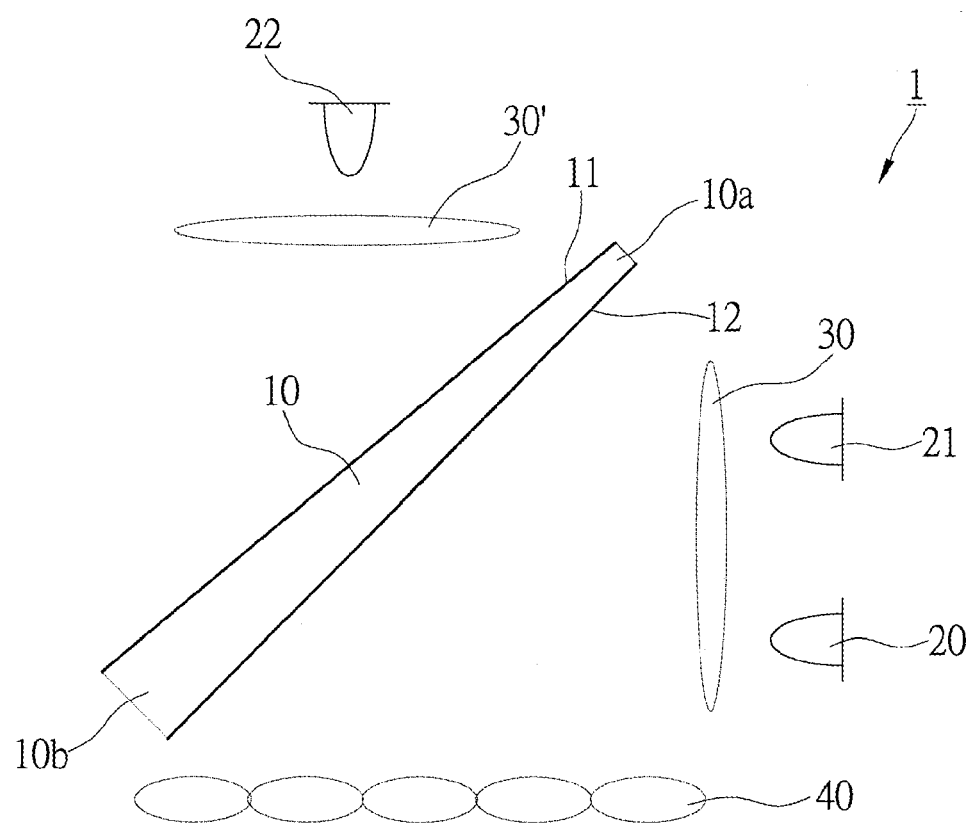
FIG. 2 is a sketch diagram of a first preferred embodiment of the present invention.

As shown in FIG. 2, a light source module 1 of a projector of the first preferred embodiment of the present invention includes a beam splitter 10, a blue light source 20, a green light source 21, a red light source 22, and two collimators 30, and 30'.

Figure 3:
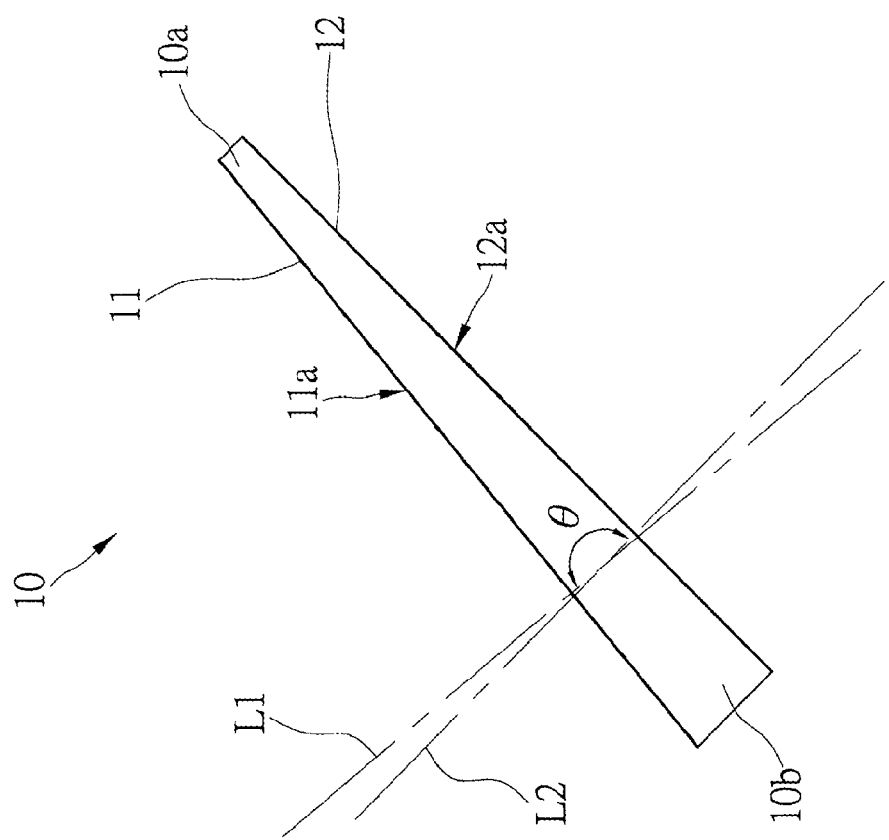
FIG. 3 is a sketch diagram of the beam splitter of the first preferred embodiment of the present invention.

As shown in FIG. 3, the beam splitter 10 is a tapered member having a narrow end 10a and a wide end 10b, and a first reflection side 11 and a second reflection side 12 on opposite ends facing each other. The narrow end 10a is proximal to the red light source 22, and the wide end 10b is distal to the red light source 22. An angle θ between a normal line L1 of the first reflection side 11, and a normal line L2 of the second reflection side 12, is in a range between 165 degrees and 180 degrees. The range of the angle θ may help in concentrating the rays passing through the beam splitter 10 and emitting it to a predetermined position. The beam splitter 10 is coated with a first splitter film 11a on the first reflection side 11, and a second splitter film 12a on the second reflection side 12. The first splitter film 11a reflects blue rays and permits red rays to pass through, and the second splitter film 12a reflects green rays and permits red rays and blue rays to pass through.

In the present invention, the blue light source 20, the green light source 21, and the red light source 22 are using light emitting diodes (LED). Each of the light sources 21, 22, and 23, may have one LED or a plurality of LEDs. As shown in FIG. 2, the blue light source 20 and the green light source 21 face the second reflection side 12 of the beam splitter 10, and the green light source 21 is closer to the second reflection side 12, than the blue light source 20. The tapered beam splitter 10 has the first reflection side 11, not parallel to the second reflection side 12 that the blue light source 20, and the green light source 21 may emit blue rays and green rays to the beam splitter 10, and the first reflection side 11, the blue rays and the green rays, are reflected on the second reflection side 12 respectively to emit them to specific positions for forming the color image. The red light source 22 faces the first reflection side 11 of the beam splitter 10 to emit red rays to the beam splitter 10. The present invention provides the red light source 22 at one place; while the blue light source 20 and the green light source 21 at the other place, they are separated by the beam splitter 10 that, the red light source 22 may have more space for thermal dissipation, or it may provide a radiator especially for the red light source 22. Therefore, with a better thermal dissipation; the red light source 22 may keep a base thereof under an acceptable temperature that, the red light source 22 may emit red rays with sufficient luminous intensity, when the projector has been turned on for a long time.

The collimators 30 and 30', may eliminate divergence of normal rays to form parallel rays. The collimator 30 is provided between the blue and green light sources 20 and 21, as well as the beam splitter 10. Respectively, the collimator 30' is provided between the red light sources 22, and the beam splitter 10.

Figure 4:
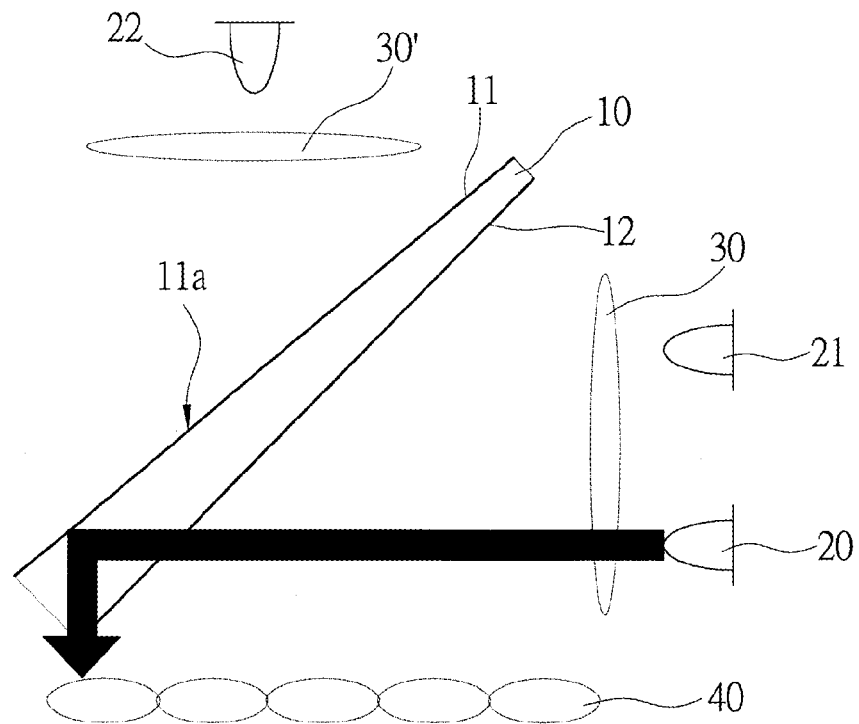
FIG. 4 is a sketch diagram of the first preferred embodiment of the present invention, showing the path of the blue ray.
Figure 5:
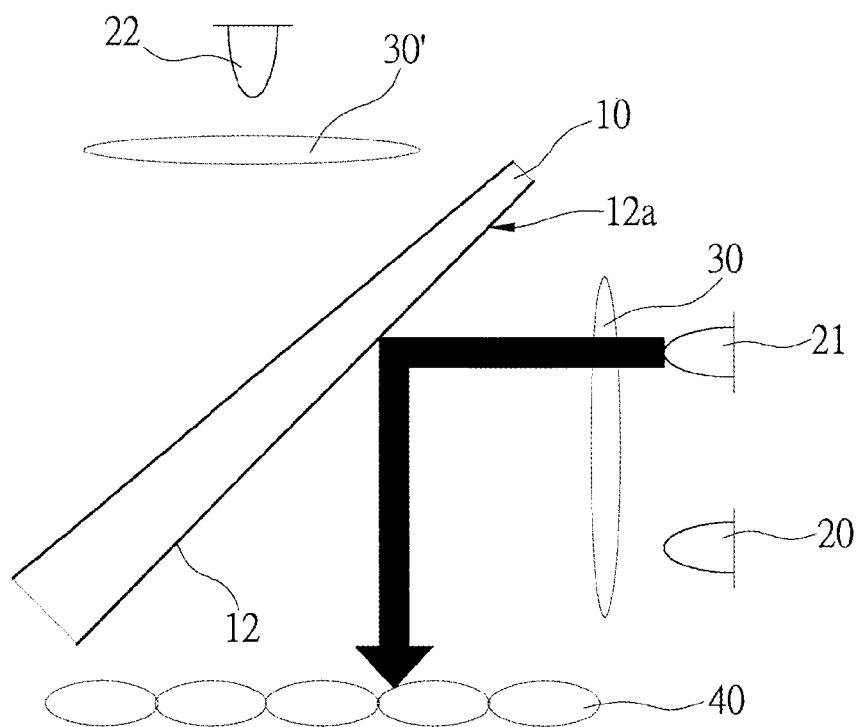
FIG. 5 is a sketch diagram of the first preferred embodiment of the present invention, showing the path of the green ray.
Figure 6:
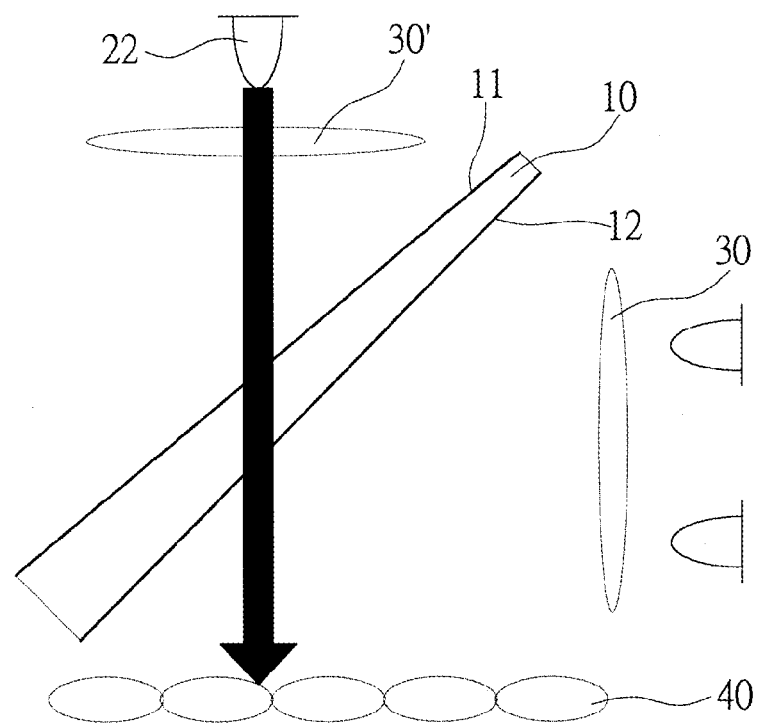
FIG. 6 is a sketch diagram of the first preferred embodiment of the present invention, showing the path of the red ray.

FIG. 4 to FIG. 6 shows the paths of the rays from the three light sources 21, 22, and 23. FIG. 4 shows that the blue light source 20 emits a blue ray to the collimator 30 and passes through the collimator 30, and then the blue ray keeps passing through the second reflection side 12 of the beam splitter 10, and then it is reflected by the first splitter film 11a on the first reflection side 11, and finally the blue ray arrives at the lens array 40 for light diffusion. FIG. 5 shows that the green light source 21 emitting a green ray to the beam splitter 10, and the green ray is reflected by the second splitter film 12a, on the second reflection side 12, to the lens array 40. FIG. 6 shows that red light source 22 emits a red ray to the beam splitter 10, and the red ray passes through the first reflection side 11 and the second reflection side 12, to the lens array 40 directly.

Finally, after the lens array 40, the rays of the light sources 21, 22, and 23 project to a DMD chip (not shown) to form a color image.

In conclusion, the light source module 1 of the present invention is incorporated in a color projector and has the red light source 22 separated from the other two light sources 20 and 21 that, the red light source 22 may have a better thermal dissipation to prolong the product life thereof.

Figure 7:
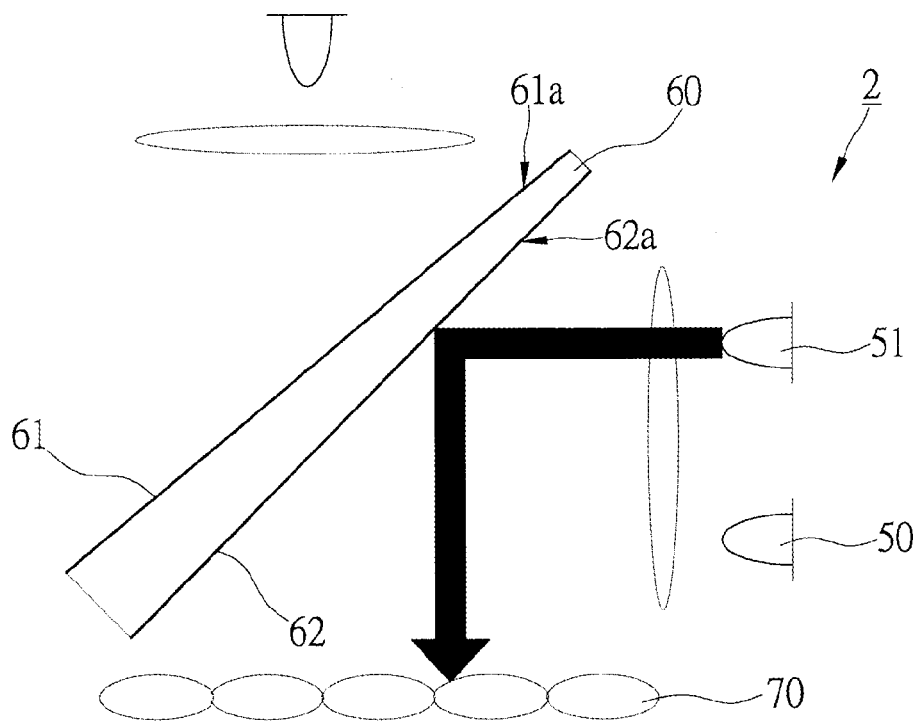
FIG. 7 is a sketch diagram of a second preferred embodiment of the present invention, showing the path of the green ray.
Figure 8:
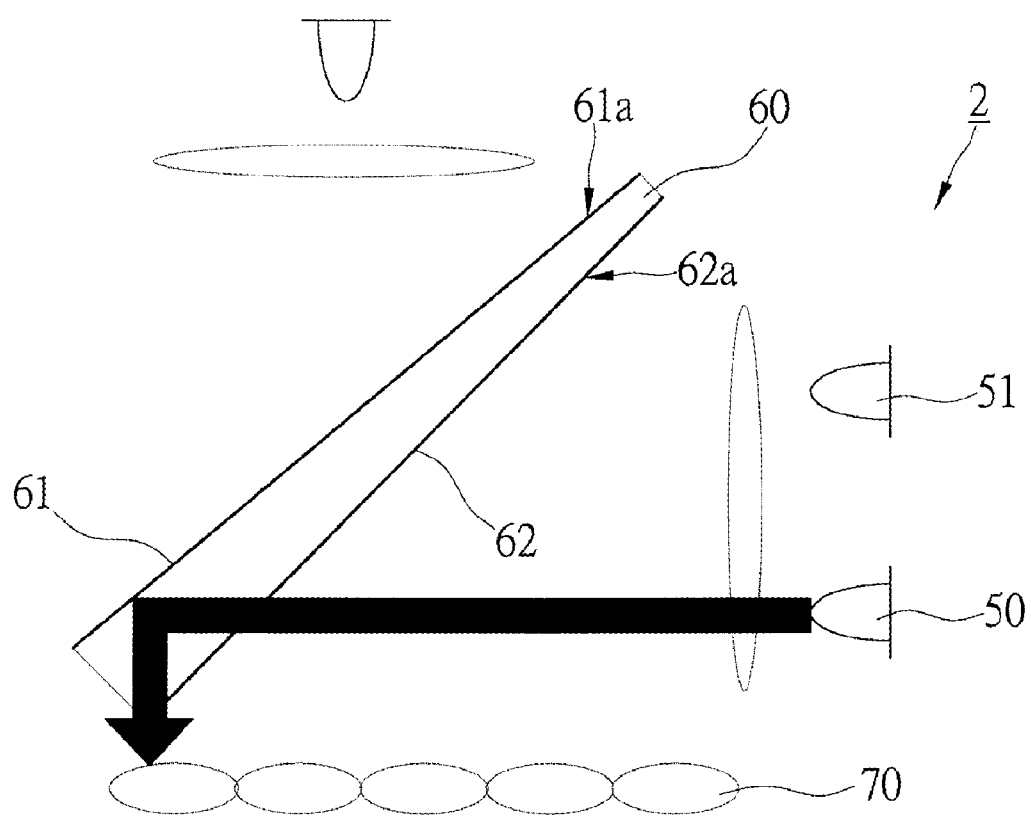
FIG. 8 is a sketch diagram of the second preferred embodiment of the present invention, showing the path of the blue ray.

FIG. 7 and FIG. 8 show a light source module 2 of the second preferred embodiment of the present invention, in which a green light source 50 is closer to a lens array 70, than a blue light source 51. A beam splitter 60 of the second preferred embodiment has a first reflection side 61 and a second reflection side 62, meanwhile, a first splitter film 61a and a second splitter film 62a, are provided on the first reflection side 61 and the second reflection side 62 respectively. Both of the first splitter film 61a and the second splitter film 62a permit red ray to pass therethrough, and the first splitter film 61a reflects green ray, while the second splitter film 62a reflect blue ray that, rays from the light sources may be guided to project to their predetermined positions.

The second preferred embodiment only changes the paths of rays, it may not affect the function of the projector, and the red light source still has a better thermal dissipation.

The description above is a few preferred embodiments of the present invention, and the equivalence of the present invention is still in the scope of claim construction of the present invention.

What is claimed is:

1. A light source module of a projector, comprising:
a beam splitter having a first reflection side, on which a first splitter film is provided, and a second reflection side, on which a second splitter film is provided, wherein an angle between a normal line of the first reflection side, and a normal line of the second reflection side, is in a range between 165 degrees and 180 degrees, both the first splitter film and the second splitter film permit red rays to pass therethrough;
a red light source at a side facing the first reflection side of the beam splitter;
a blue light source at a side facing the second reflection side of the beam splitter; and
a green light source on the same side with the blue light source facing the second reflection side of the beam splitter.

2. The light source module as defined in claim 1, wherein the first splitter film reflects blue rays, and the second splitter film permits blue rays to pass therethrough, and reflects green rays.

3. The light source module as defined in claim 2, wherein the first splitter film reflects green rays, and the second splitter film permits green rays to pass therethrough, and reflects blue rays.

4. The light source module as defined in claim 1, wherein the beam splitter is a tapered member, having a narrow end and a wide end, and the red light source is proximal to the narrow end, and distal to the wide end.

5. The light source module as defined in claim 4, further comprising a plurality of collimators between the light sources and the beam splitter.

\* \* \* \* \*